(12) United States Patent
Harrold et al.

(10) Patent No.: US 8,704,987 B2
(45) Date of Patent: Apr. 22, 2014

(54) GRADED INDEX BIREFRINGENT COMPONENT AND MANUFACTURING METHOD THEREOF

(75) Inventors: Jonathan Harrold, Warwick (GB); Graham John Woodgate, Henley-On-Thames (GB); Chao-Yuan Chen, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 684 days.

(21) Appl. No.: 12/984,748

(22) Filed: Jan. 5, 2011

(65) Prior Publication Data

US 2012/0069279 A1   Mar. 22, 2012

(30) Foreign Application Priority Data

Sep. 22, 2010 (GB) .................................. 1015958.0

(51) Int. Cl.
*G02F 1/1337* (2006.01)
*G02F 1/1335* (2006.01)

(52) U.S. Cl.
USPC ............................ 349/129; 349/119; 349/187

(58) Field of Classification Search
None
See application file for complete search history.

(56) References Cited

U.S. PATENT DOCUMENTS

| | | | |
|---|---|---|---|
| 5,132,147 A | 7/1992 | Takiguchi et al. | |
| 5,631,754 A | 5/1997 | Jannson et al. | |
| 6,262,788 B1 | 7/2001 | Hanrahan et al. | |
| 6,583,938 B1 | 6/2003 | Woodgate et al. | |
| 7,019,890 B2 | 3/2006 | Meredith et al. | |
| 7,218,429 B2 | 5/2007 | Batchko | |
| 8,031,276 B2 | 10/2011 | Woodgate et al. | |
| 2005/0243237 A1 | 11/2005 | Sasuga | |
| 2005/0248705 A1* | 11/2005 | Smith et al. .................. | 349/124 |
| 2006/0098296 A1 | 5/2006 | Woodgate et al. | |
| 2008/0266387 A1 | 10/2008 | Krijn et al. | |
| 2008/0266388 A1 | 10/2008 | Woodgate et al. | |
| 2011/0299000 A1 | 12/2011 | Woodgate et al. | |

FOREIGN PATENT DOCUMENTS

| | | |
|---|---|---|
| CN | 101444105 A | 5/2009 |
| CN | 101512391 A | 8/2009 |
| GB | 2406730 A | 6/2005 |
| GB | 2469693 A | 10/2010 |
| JP | 7077748 | 3/1995 |
| WO | 03015424 | 2/2003 |
| WO | 2005006056 | 1/2005 |
| WO | 2008062188 | 5/2008 |
| WO | 2011/036736 A1 | 3/2011 |

OTHER PUBLICATIONS

English translation of abstract and pertinent parts of JP 7077748 A.
English translation of abstract and pertinent parts of WO 2011/036736 A1.
English translation of abstract and pertinent parts of CN 101444105 A.
English translation of abstract and pertinent parts of CN 101512391 A.

* cited by examiner

*Primary Examiner* — Michelle R Connelly
(74) *Attorney, Agent, or Firm* — McClure, Qualey & Rodack, LLP

(57) ABSTRACT

A graded index birefringent component is described and shown with at least one liquid crystal layer having a plurality of lens segments, wherein the orientation of the liquid crystal molecules varies across each lens segment of the liquid crystal layer.

19 Claims, 11 Drawing Sheets

GRADED INDEX BIREFRINGENT COMPONENT AND MANUFACTURING METHOD THEREOF

RELATED APPLICATIONS

This application claims priority to UK Application Serial Number 1015958.0, filed Sep. 22, 2010, which is herein incorporated by reference.

BACKGROUND

1. Technical Field

The present disclosure relates to optical components. More particularly, the present disclosure relates to graded index birefringent components.

2. Description of Related Art

Surface relief birefringent elements are described, for example, in WO-03/015424 and WO-2005/006056. A surface relief birefringent element is formed from a surface relief interface between an isotropic layer and a birefringent layer. Light of a first linear polarization state passing through the surface relief birefringent element sees a first refractive index step at the surface relief interface between the isotropic layer and the birefringent layer, whereas light of a second orthogonal linear polarization state sees a second, different refractive index step at the surface relief interface.

Surface relief birefringent elements can be formed by a liquid crystal cell filling method as shown in FIG. 1. A substrate 2, such as a glass or polymer substrate, has an isotropic polymer layer 4 formed on its surface by ultraviolet (UV) casting, embossing, thermal forming or other well known methods. An alignment layer 6, for example polyimide, is formed on the surface of the isotropic polymer layer 4, for example, by spin coating, printing or other known methods. The material of the alignment layer 6 is cured and rubbed to produce a directional alignment property. Another substrate 8 with another alignment layer 10 forms a cell gap between the alignment layers 6 and 10 which is capillary filled by a liquid crystal material 12 in a direction 14 typically at elevated temperature.

The liquid crystal material 12 is a curable liquid crystal material. In this case, following filling, the liquid crystal material 12 is cured, for example thermally, by light, such as from a UV lamp 28 or by electron beam radiation. Such materials allow high ruggedness and can enable a reduction in the thickness of devices.

Such a filling process has a number of difficulties. A lenticular surface with an array of elongate cylindrical lenses is a common surface relief interface. In this case, the capillary fill will often take place along the length of the lenses. However, these lenses may be susceptible to blockage, so that they do not fill uniformly, creating bubbles which degrade optical performance. In curable liquid crystal materials, bubbles may contain oxygen which inhibits cure of some types of polymerizable liquid crystal materials. This can cause regions of strain in the cured liquid crystal material, degrading alignment properties of the liquid crystal material near the bubbles. More even, filling can be achieved by incorporating a larger spacer gap between the alignment layers 6 and 10. However, such an approach disadvantageously uses more material and so increases cost. Further, the uniformity of the thickness of additional material can be difficult to maintain, so the final device may not be flat, which may cause non-uniform optical output, for example, in an autostereoscopic display system. During filling, a vacuum can be used to avoid the formation of air bubbles. Vacuum equipment is disadvantageously expensive, and the high levels of vacuum used for vacuum filling may not be compatible with the lens polymer materials.

The surface relief birefringent element of FIG. 1 requires the substrates 2 and 8. Such substrates typically have a thickness of 0.4 mm or greater. The overall thickness of the surface relief birefringent element is thus increased. To reduce thickness after fabrication, it may be possible to remove the substrate 8 from the cured liquid crystal material 12, but if this is glass, it may be prone to cracking. The substrate 8 may comprise a metal foil, which when removed still produces a transparent device. The surface energies of the interfaces between the cured liquid crystal material 12 and the alignment layers 6 and 10 may be similar, so that delamination may take place off either surface, therefore resulting in unreliability of delamination release. Further, the addition of alignment layer 10 adds cost to the processing method. Further, the adhesion of the cured liquid crystal material 12 to the alignment layer 6 is required to be as high as possible, to maximize the endurance properties of the surface relief birefringent element. Higher surface energy may be achieved by addition of a wetting agent to the liquid crystal material 12. However, this may also increase the adhesion to the alignment layer 10, and thus reduce the reliability of delamination at the planar interface between the liquid crystal material 12 and the alignment layer 10.

Further, the filling process can take some hours, particularly for a large cell required for large displays or for motherglass processing methods. Liquid crystal polymer materials may be liable to unwanted thermal cure prior to cure by, for example, UV radiation. This means that they are difficult to use reliably in processes with prolonged process time. Premature cure may result in regions of non-uniform liquid crystal alignment and filling errors.

Surface relief birefringent elements such as shown in FIG. 1 are difficult to cut after processing in motherglass form. It is required to cut through the glass substrates 8 and 2 as well as through cured polymer layers, such as the cured liquid crystal material 12 and the isotropic polymer layer 4, without causing delamination of the isotropic polymer layer 4 or the cured liquid crystal material 12.

The manufacture of uniform thickness birefringent elements using liquid crystal in solvent is described, for example, in U.S. Pat. No. 5,132,147, U.S. Pat. No. 6,262,788 and "Paliocolor polymerizable liquid crystalline acrylates for the manufacturing of ultrathin optical films" Cordula Mock-Knoblauch SID Digest 2006. In the latter, a coating solution comprises a liquid crystal polymer material in a solvent solution. The coating solution is applied wet to the surface of a polymer film. The solvent is driven off, and the liquid crystal polymer material is exposed to UV light to cure the film.

FIG. 2 shows a coating method for surface relief birefringent elements. A substrate 2 bearing an alignment layer 6 is overcoated by a coater, such as a slot coater 19 filled with a liquid crystal polymer material 12. Such an arrangement would be intended to produce a film of liquid crystal polymer material 12 in contact with air or a gas such as nitrogen. The film is cured by a UV lamp 28. If the prior art process were applied to the coating of surface relief birefringent elements with a curable liquid crystal polymer material, a number of difficulties would arise. The typical dry film thickness of the prior art planar devices is between 1 to 10 microns and requires the deposition of a wet thickness of 10 to 30 microns. The typical sag of the surface relief birefringent elements used in autostereoscopic displays is 15-60 microns, and so the thickness of typical cured films would need to be substantially more than that delivered by the prior art methods. Further, the flow of the drying material on the substrate 2 may not deliver a flat surface due to differential drying properties across the width of the substrate 2.

Additionally, the interaction of a single alignment layer 6 with the liquid crystal material 12 diminishes with increasing liquid crystal layer thickness. For relatively thick surface relief birefringent elements, it is desirable that an alignment layer is fixed on both sides of the liquid crystal layer. It is further often desirable that there is a controlled twist between the alignment directions at the planar and surface relief interfaces. In structures with a single alignment layer, a precise twist cannot be achieved as there is no upper surface to define an alignment. Further, the surface tension properties of coated microstructures can result in the upper surface assuming a non-flat structure, with different alignment properties at the cusps of the lenses compared to the center of the lenses. Such a structure will result in reduced optical quality. The elements need to be maintained clean during subsequent handling. Therefore, an additional protective cover may need to be added, further adding to the cost of the elements.

WO2008062188 describes a method to form a surface relief birefringent element using a coating apparatus as shown in FIG. 3. The structure comprising a substrate 2, an isotropic polymer layer 4, and an alignment layer 6 is mounted on a substrate 26, and a curable liquid crystal material 12 is applied by an applicator 11 to the surface of the isotropic polymer layer 4 and the alignment layer 6 while a film 16 with an aligning property is applied to the opposite surface of the curable liquid crystal material 12 by a roller 20 rolling in a direction 22. The cured film 17 is produced by applying UV light from a UV lamp 28 through the film 16. Such an arrangement provides a convenient method to fabricate a surface relief birefringent element with alignment features on surface relief and planar surfaces. Such surface relief birefringent elements have several advantages including that they are convenient to cut, have high optical quality with low thickness, do not suffer from premature thermal cure and are quick to coat compared to capillary filling methods.

The optical power of surface relief birefringent elements illuminated by a defined polarization state is limited by the curvature of the surface and the refractive indices of the birefringent and isotropic layers. The radius of curvature of the lens is typically constrained to be greater than half of the lens pitch. Further, the choice of refractive indices, particularly for curable liquid crystal materials may be limited.

It is sometimes desirable to increase the optical power of the surface relief birefringent element to a value greater than can be provided by a single surface and conventional liquid crystal materials. One arrangement is as shown in FIG. 4 in which a first surface relief birefringent element 50 comprising an isotropic polymer layer 4 and a cured liquid crystal material 12 on a substrate 2 is aligned to a second surface relief birefringent element 60 with respective substrate, isotropic polymer layer and cured liquid crystal material. Such an arrangement has a high thickness, particularly due to the isotropic polymer layer 4 and the substrate 2 and requires alignment of the two respective surface relief birefringent elements 50 and 60 thus having an increased cost.

FIG. 5 shows an arrangement to further increase the optical power of the surface relief birefringent elements in which four surface relief birefringent elements 50, 60, 70 and 80 are arranged in series. Such an arrangement has even greater thickness and cost.

FIG. 6 shows on-axis imaging of the arrangement in which on-axis rays 90 are imaged to a focus 92 at an image plane 94 (such as the pixel plane of an liquid crystal display (LCD) in an autostereoscopic display) by surface relief birefringent elements 50, 60, and 70 respectively. In this case, the on-axis rays 90 are correctly imaged by each surface to the image plane 94. Further, as shown in FIG. 7, for the example of a three surface relief birefringent elements stack, the separation of the surface relief birefringent elements 50, 60, and 70 means that the imaging properties of the arrangement for off-axis rays are degraded due to vignetting of light between apertures in adjacent surface relief birefringent elements 50, 60, and 70 in the stack. Substrates 2 are removed from the figures and three surface relief birefringent elements 50, 60, and 70 are shown for clarity. However, in the off-axis case as shown in FIG. 7, multiple spots 93 and 95 are produced at the image plane 94 so that the image produced by the surface relief birefringent elements stack is degraded. Thus, it is difficult to significantly increase the optical power using surface relief birefringent elements while maintaining image quality and minimizing cost.

SUMMARY

According to one embodiment of the present invention, a graded index birefringent component includes at least one liquid crystal layer. The liquid crystal layer has a plurality of lens segments. Each of the lens segments has a plurality of liquid crystal molecules therein, wherein the orientation of the liquid crystal molecules varies across each lens segment of the liquid crystal layer.

According to another embodiment of the present invention, a method for manufacturing a graded index birefringent component includes the following steps: forming a surface relief element having a plurality of sags therein; forming a curable liquid crystal material on the surface relief element; applying an electric field across the curable liquid crystal material, wherein the curable liquid crystal material has a plurality of lens segments self aligned with the sags of the surface relief element, and the electric field varies across each lens segment of the curable liquid crystal material; and curing the curable liquid crystal material to form a liquid crystal layer. Hence, the curable liquid crystal material is cured to transfer to a liquid crystal layer.

The foregoing embodiments of the present invention have at least one of the following advantages over the known prior art.

(1) A stack of a surface relief birefringent element and a cured liquid crystal layer can conveniently be formed.

(2) The surface relief birefringent element and the cured liquid crystal layer are in intimate contact, so that off-axis vignetting is minimized.

(3) The lens segments of the cured liquid crystal layer are self aligned with the sags of the surface relief birefringent element without the need for a further mechanical lens axis alignment step.

(4) A liquid crystal material is not used to capillary fill and can be coated onto the surface relief birefringent element in a very short timescale over large areas compared to capillary or vacuum filling. Such graded index birefringent component can thus be made so that the liquid crystal material is not prone to premature cure. Further, the liquid crystal material does not have to be vacuum filled or cured in a nitrogen blanket, thus reducing cost and complexity of equipment.

(5) The graded index birefringent component may conveniently be made in motherglass form and cut after curing of the liquid crystal material, for example, by UV laser cutting. Alternatively, the cured structure can be scribed and broken using standard glass cutting techniques.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 8:
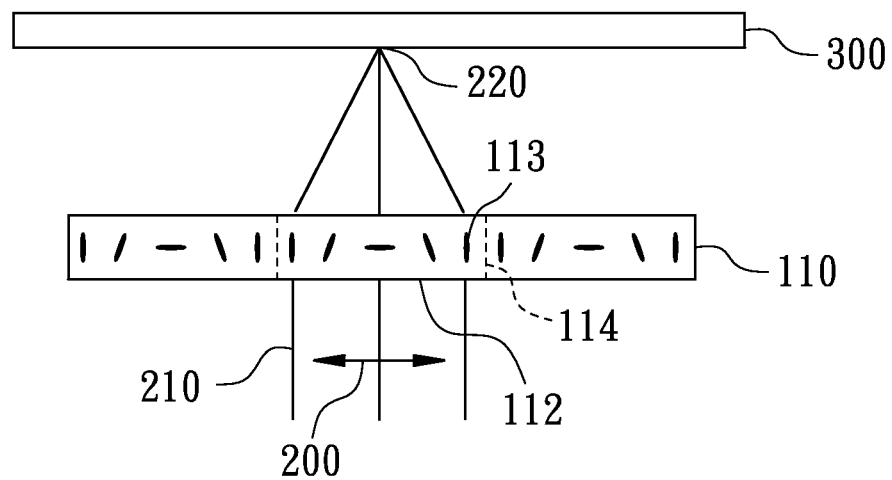
FIG. 8 shows a graded index birefringent component according to one embodiment of the present invention.

FIG. 8 shows a graded index birefringent component 100 according to one embodiment of the present invention. The graded index birefringent component 100 includes at least one liquid crystal layer 110. The liquid crystal layer 110 has a plurality of lens segments 112. Each of the lens segments 112 has a plurality of liquid crystal molecules 113 therein, wherein the orientation of the liquid crystal molecules 113 varies across each lens segment 112 of the liquid crystal layer 110.

Specifically, the liquid crystal molecules 113 in the edge of each lens segment 112 of the liquid crystal layer 110 have a homeotropic alignment. The liquid crystal molecules 113 in the center of each lens segment 112 of the liquid crystal layer 110 have a homogeneous alignment. The orientation of the liquid crystal molecules 113 gradually varies from the edge to the center of each lens segment 112 of the liquid crystal layer 110. The edge of the respective lens segment 112 is represented by effective cusp regions 114 which are turning points in the orientation of the liquid crystal molecules 113.

In use, incident linearly polarized light 200 is incident along rays 210 onto the surface of the liquid crystal layer 110. Normally, incident light 200 are imaged across the lens segment 112 width with different optical path lengths due to the difference in resolved refractive index for the polarization state of the incident light 200. Thus, a lensing effect occurs to produce a focus 220 at a plane 300. Advantageously, the graded index birefringent component 100 can be formed without a thicker isotropic layer.

FIGS. 9-23 show a method for manufacturing a graded index birefringent component 100 according to several embodiments of the present invention.

Figure 9:
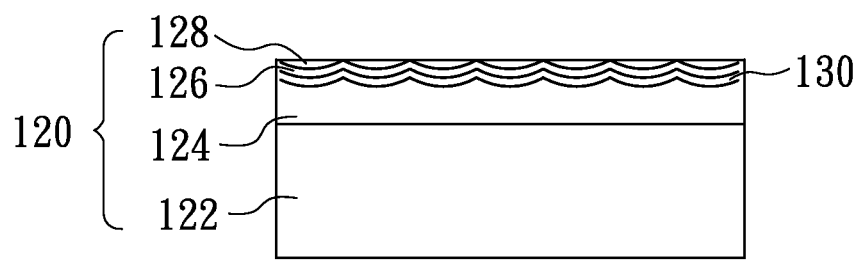
FIGS. 9-23 show a method for manufacturing a graded index birefringent component according to several embodiments of the present invention.

FIG. 9 shows a surface relief birefringent element 120. The surface relief birefringent element 120 includes a substrate 122, an isotropic layer 124, an alignment layer 126, and a birefringent layer 128. The isotropic layer 124 is disposed on the substrate 122. The isotropic layer 124 has a plurality of sags therein. The birefringent layer 128 covers the isotropic layer 124. The alignment layer 126 is sandwiched between the birefringent layer 128 and the isotropic layer 124.

A bottom electrode 130 is disposed between the isotropic layer 124 and the birefringent layer 128. In the present embodiment, the bottom electrode 130 is sandwiched between the isotropic layer 124 and the alignment layer 126. Optionally, an alignment layer (not shown) may be formed on the top surface of the birefringent layer 128. More typically, no further alignment layer is required due to the intrinsic alignment properties of the birefringent layer 128.

The surface relief birefringent element 120 of FIG. 9 may be made in accordance with the manufacturing method disclosed in WO-2008/062188, which is hereby incorporated herein by reference.

Figure 10:
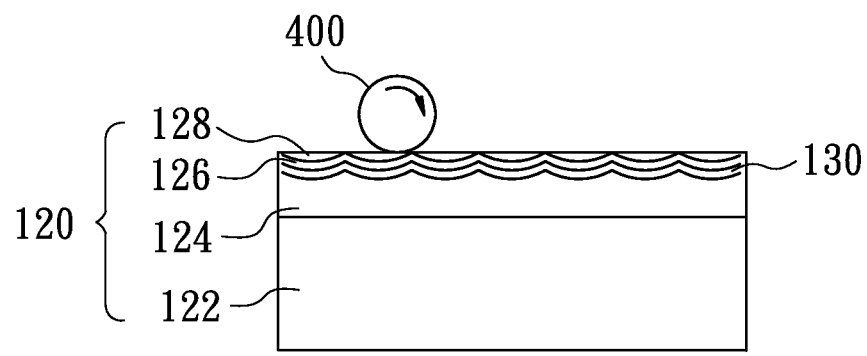

As shown in FIG. 10, a surface alignment directionality may be formed on the top surface of the birefringent layer 128, for example, by rubbing with a rubbing cloth mounted on a spinning drum 400. The rubbing direction is typically set parallel to the liquid crystal alignment direction at the top surface of the birefringent layer 128 but may be in a different direction.

Figure 11:
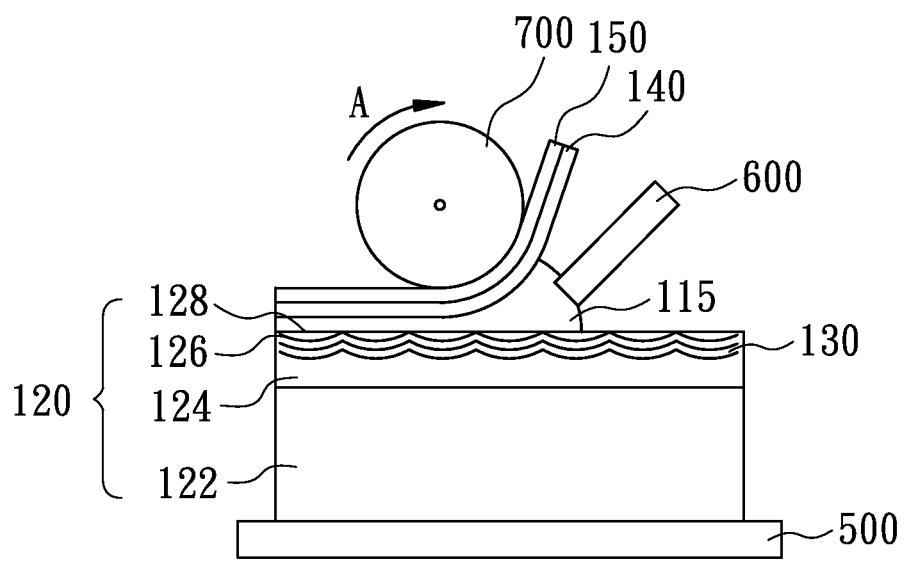

As shown in FIG. 11, the surface relief birefringent element 120 is mounted on a heater pad 500, and a curable liquid crystal material 115 (in a nematic phase), such as a reactive mesogen liquid crystal, is applied to the top surface of the birefringent layer 128. This may be, for example, by an application device 600 that may comprise a heated supply of curable liquid crystal material 115. A roller 700 is rolled in a direction A or pushed parallel to the surface relief interface so that a flexible sheet 140 with a top electrode 150 confines the curable liquid crystal material 115 into a gap between the flexible sheet 140 and the top surface of the birefringent layer 128. The top electrode 150 may be a metallic coating on the rear of the flexible sheet 140.

The material of the flexible sheet 140 may include Polyethylene terephthalate (PET). The flexible sheet 140 provides an alignment function without the addition of further alignment layers. Alternatively, the top electrode 150 may be a metal film, and the flexible sheet 140 may be an alignment layer, such as rubbed polyimide. Alternatively, the flexible sheet 140 may be a diffractive alignment structure embossed into the top electrode 150 which may be a metal or polymer film.

The flexible sheet 140 has an aligning function with an alignment direction set respective to the alignment direction at the top surface of the birefringent layer 128 depending on the particular application, but typically parallel to the alignment direction at the alignment layer 126. Thus, the alignment of liquid crystal at the top surface of the birefringent layer 128 and the surface of the flexible sheet 140 is controlled by alignment of the respective surfaces.

The thickness of the gap between the flexible sheet 140 and the top surface of the birefringent layer 128 may be set by spacer elements, such as spacer balls.

Figure 12:
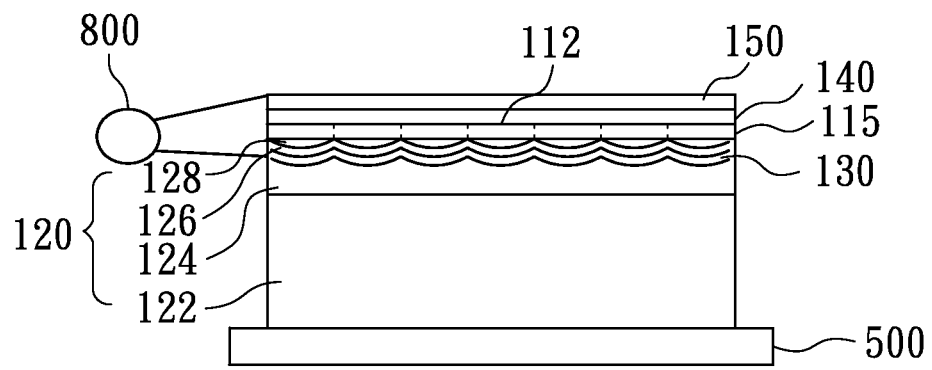

As shown in FIG. 12, following coating, the top electrode 150 and the bottom electrode 130 are electrically attached to a voltage source 800. The thicknesses of the birefringent layer 128 and the flexible sheet 140 are set for the applied electric field, and thus a spatially non-uniform electric field is provided across the width of each lens segment 112 of the curable liquid crystal material 115, wherein the lens segments 112 of the curable liquid crystal material 115 are self aligned with the sags of the surface relief birefringent element 120. The electric field causes the liquid crystal molecules in each lens segment 112 to reorient by different amounts across the width of each lens segment 112.

Figure 13:
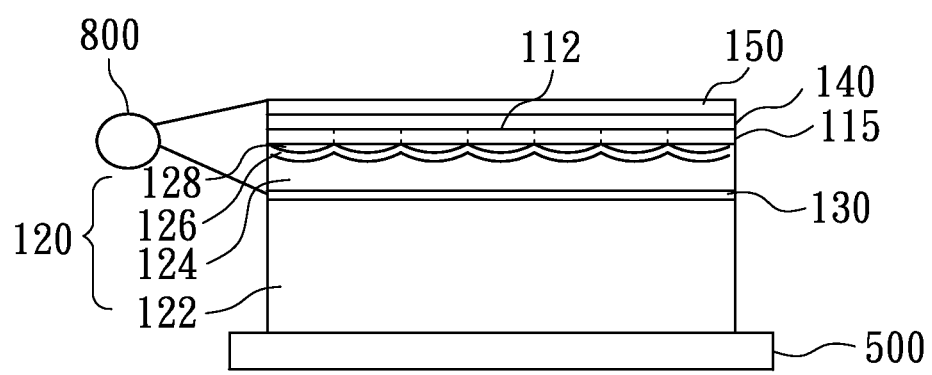

FIG. 13 shows the step of applying the spatially non-uniform electric field according to another embodiment of the present invention. In this embodiment, the bottom electrode 130 may be a planar electrode underneath the isotropic layer 124. The dielectric constants of the isotropic layer 124 and the birefringent layer 128 are selected so that the electric field dropped across each respective layer varies across the width of each lens segment 112. Thus, a spatially non-uniform electric field may be produced in each lens segment 112 of the curable liquid crystal material 115 prior to cure, enabling a graded-index (GRIN) alignment function in the cured liquid crystal layer 110. This enables a planar bottom electrode 130, reducing reflection artifacts. Further, temporary electrodes fully external to the device can be used so that the substrate 122 is not present in the completed device. Such an arrangement advantageously has increased transmission due to the absence of the bottom electrode 130 in operation.

Figure 14:
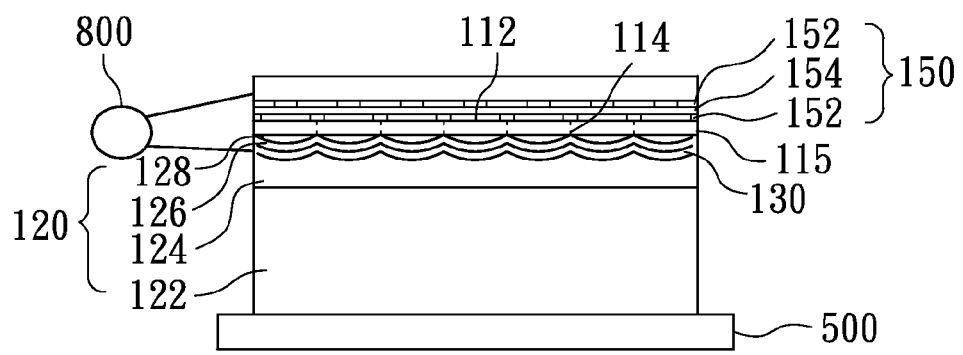
Figure 15:
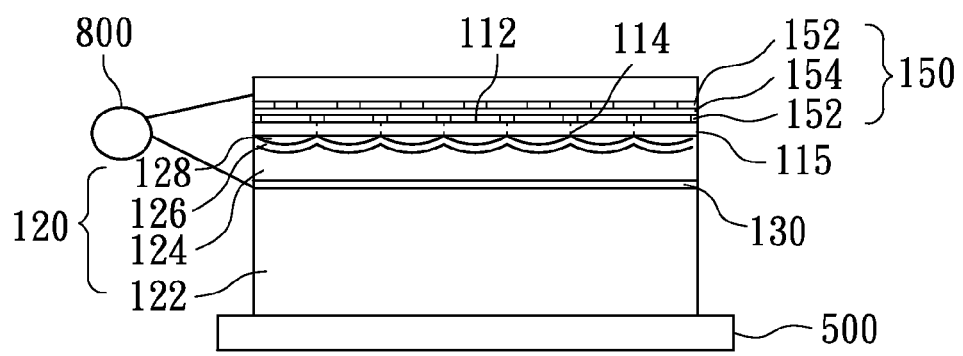

FIG. 14 shows that the top electrode 150 may be arranged to comprise more than one electrode layers 152 separated by a dielectric layer 154. At least one of the electrode layers 152 may be patterned to provide, for example, a triode structure as shown. The patterned electrode layers 152 may have substantially the same pitch as the sags of the surface relief birefringent element 120 and be aligned with the cusp regions 114. Advantageously, this arrangement may cooperate with the bottom electrode 130 so that the variation in voltage across each lens segment 112 can be increased. The bottom electrode 130 may be a planar electrode as shown in FIG. 15. The top electrode 150 used in the fabrication process may be present or absent from the final component When the alignment is correctly set, a UV lamp is activated to cure the liquid crystal material 115 to form a liquid crystal layer 110, thus permanently fixing the orientation of the liquid crystal molecules.

In the case that the flexible sheet 140 and the top electrode 150 are non-transmissive, the UV lamp may be positioned on the opposite side, and the heater pad 500 and the surface relief birefringent element 120 are transparent.

Figure 16:
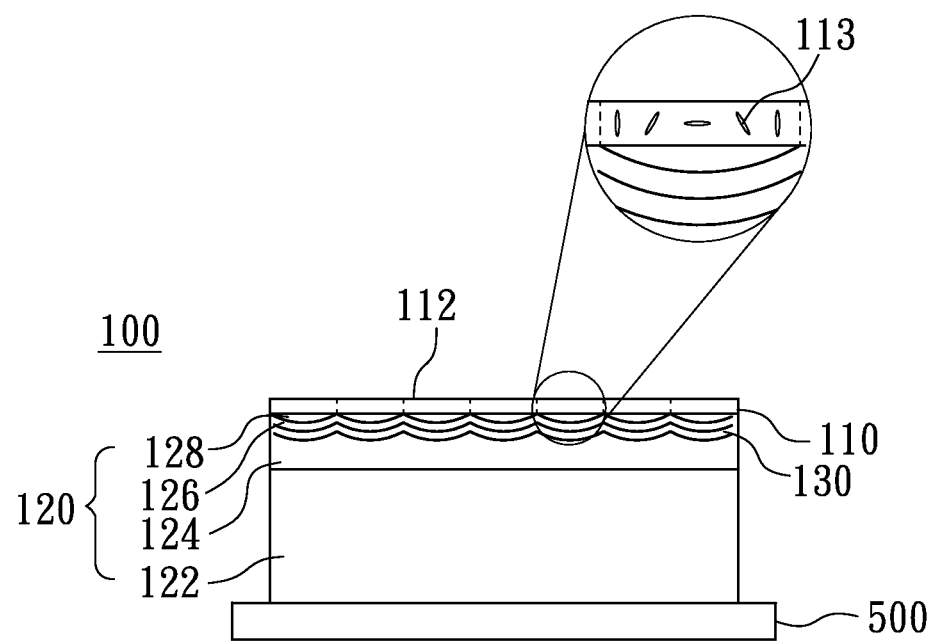

This method can provide a graded index birefringent component 100 comprising a cured liquid crystal layer 110 stacked on a surface relief birefringent element 120 as shown in FIG. 16. In the edges of the lens segments 112, the electric field is maximized, and the liquid crystal molecules 113 have a homeotropic alignment while they retain a homogeneous alignment in the centers of the lens segments 112 where the electric field is lower. For light of a polarization state parallel to the liquid crystal director in the centers of the lens segments 112, an optical path difference across the lens segments 112 results in a focusing function, thus providing increased optical power.

Figure 1:
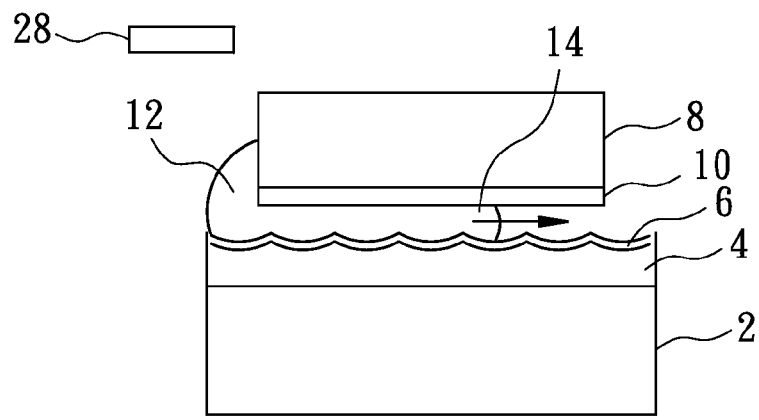
FIG. 1 shows a prior art filling method to form a surface relief birefringent element.
Figure 2:
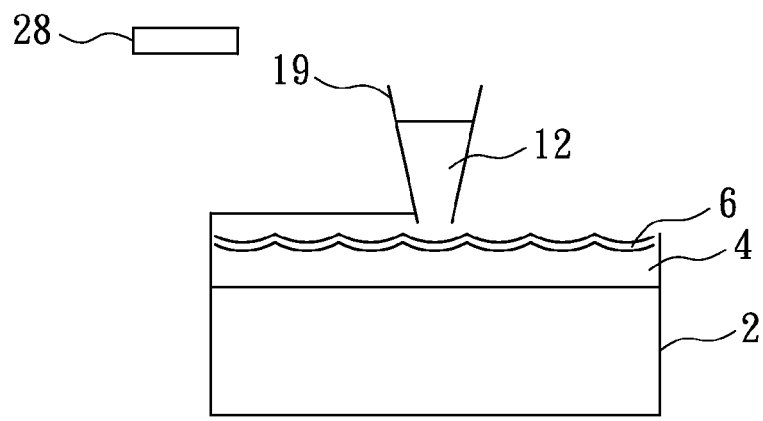
FIG. 2 shows a coating method for surface relief birefringent elements.
Figure 3:
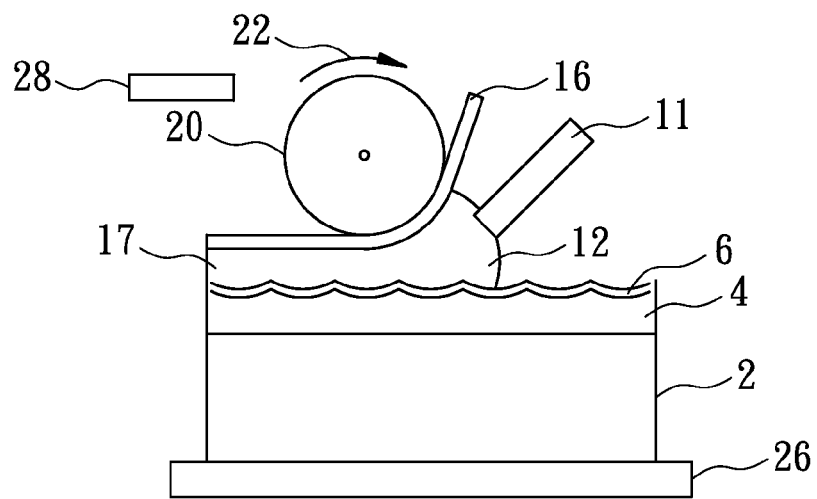
FIG. 3 shows a coating apparatus to form a surface relief birefringent element.
Figure 4:
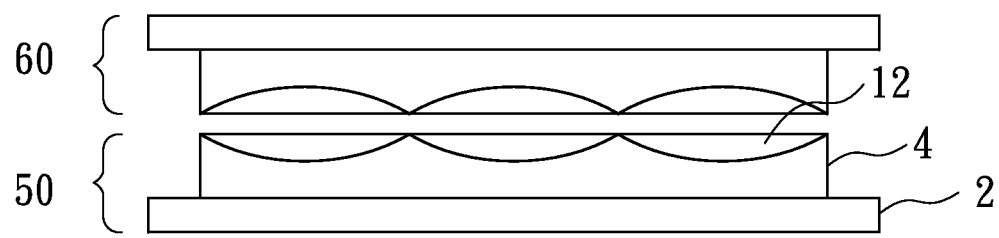
FIG. 4 shows a stack of surface relief birefringent elements.
Figure 5:
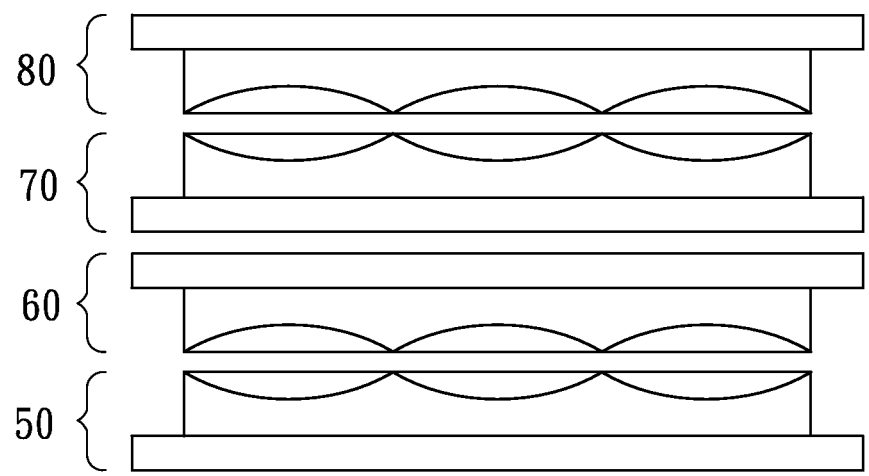
FIG. 5 shows a further stack of surface relief birefringent elements.
Figure 6:
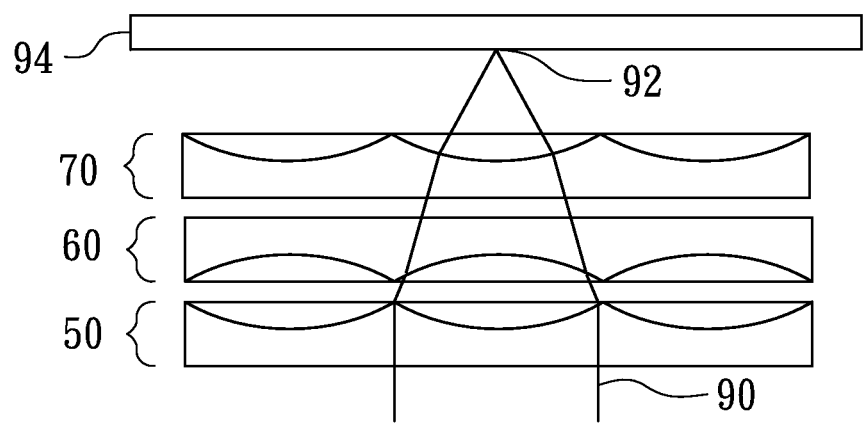
FIG. 6 shows on axis imaging of a stack of surface relief birefringent elements.
Figure 7:
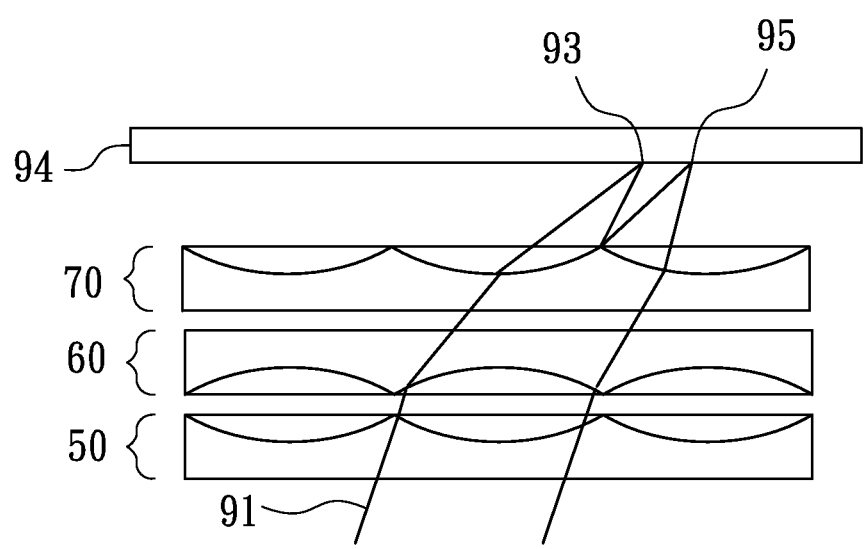
FIG. 7 shows off axis imaging of a stack of surface relief birefringent elements.
Figure 17:
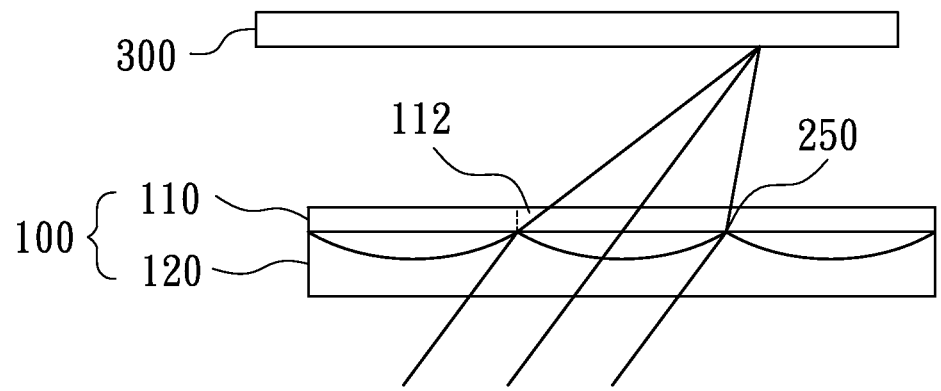

The off-axis operation of the graded index birefringent component 100 shown in FIG. 16 is shown in FIG. 17. The surface relief birefringent element 120 serves to provide a first focusing function, while the cured liquid crystal layer 110 serves to provide a further focusing function as shown in FIG. 17. Thus, the optical power of the graded index birefringent component 100 can be increased. Further, the surface relief birefringent element 120 and the cured liquid crystal layer 110 are in intimate contact so that errors caused by separation of the surface relief birefringent element 120 and the cured liquid crystal layer 110, such as those shown in FIG. 7, are minimized as the width of the region 250 in which the light from the surface relief birefringent element 120 enters the lens segments 112 of the cured liquid crystal layer 110 aligned with the sags of the surface relief birefringent element 120 is minimized. Advantageously, the surface relief birefringent element 120 provides both a surface alignment property and a variable electric field across the curable liquid crystal material 115 within each lens segment 112. The lens segments 112 of the cured liquid crystal layer 110 produced by this method are self aligned with the surface relief birefringent element 120, thus reducing the cost of the element. Further the additional material costs are restricted to just a further layer of liquid crystal material so that the cost increment for additional optical power is minimized.

Figure 18:
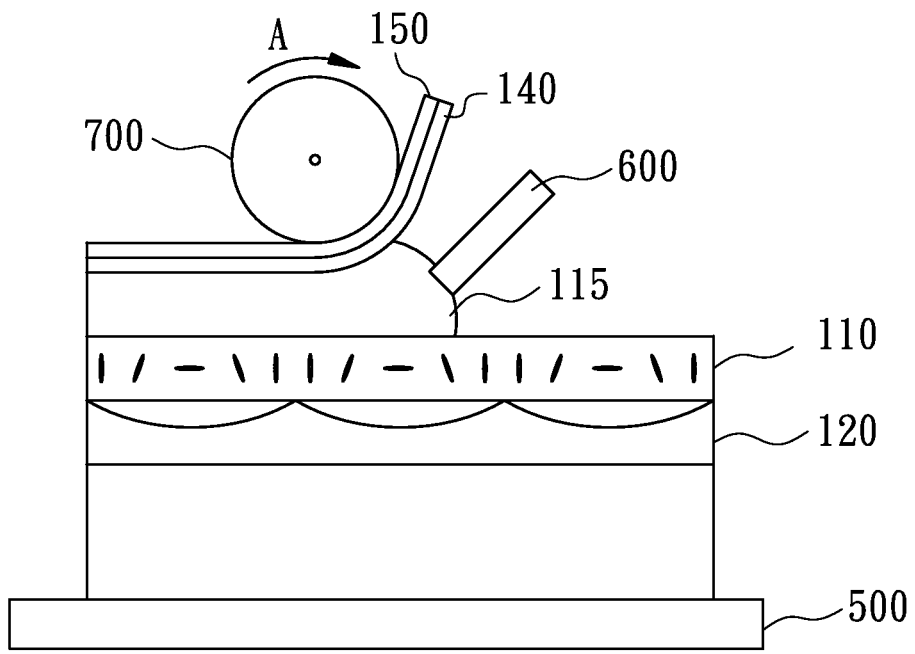
Figure 19:
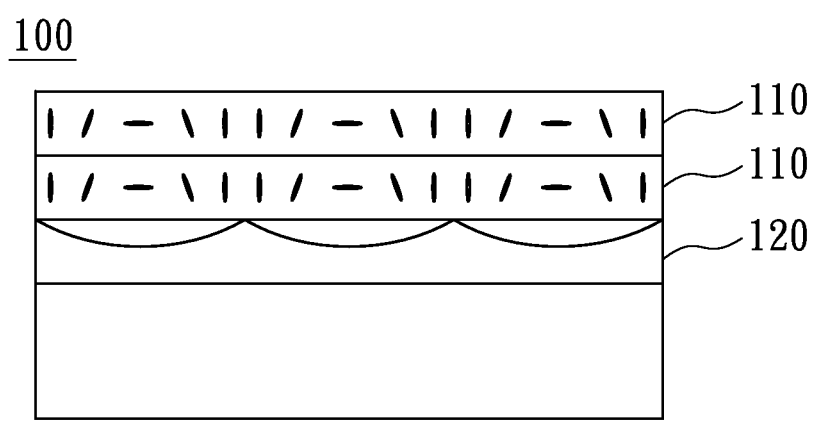

As shown in FIG. 18, to increase the optical power further, further layers, such as another liquid crystal layer 110, can be constructed by repeating the rubbing and coating steps as shown in FIGS. 10-12 on the graded index birefringent component 100 of FIG. 16 to provide the graded index birefringent component 100 as shown in FIG. 19. Each of the liquid crystal layers 110 is self aligned with the underlying structures and has no additional substrates or isotropic layers, and thus the cost of a stack of multiple layer lenses can be minimized.

Figure 20:
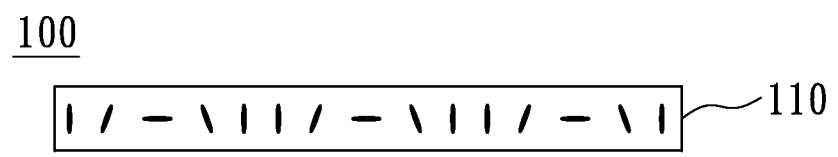
Figure 21:
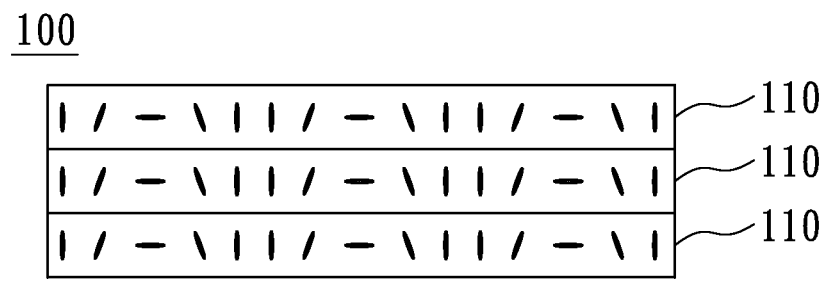

The liquid crystal layer(s) 110 may be delaminated from the surface relief birefringent element 120 so as to provide a graded index birefringent component 100 comprising a single liquid crystal layer 110 as shown in FIG. 20 or a stack of aligned liquid crystal layers 110 as shown in FIG. 21. In this case, the surface relief birefringent element 120 may be reused. Delamination of the surface relief birefringent element 120 and the liquid crystal layer(s) 110 can be enhanced by using a material, such as PET, as the alignment material formed on the surface of the surface relief birefringent element 120, thus also providing a release layer function. In this case, the surface relief birefringent element 120 may be a surface relief element without the birefringent lens functionality. That is, the birefringent layer 128 of the surface relief birefringent element 120 may be replaced by an isotropic layer as the birefringent lens functionality is not required.

Figure 22:
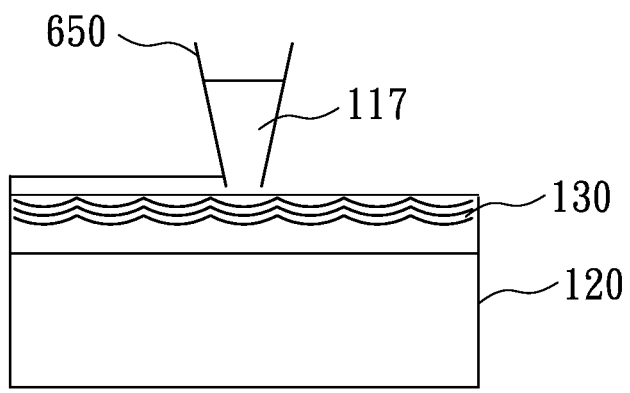
Figure 23:
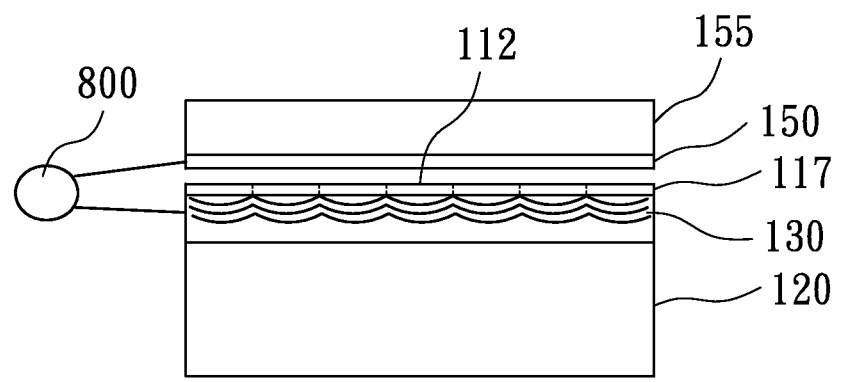

An alternative coating method to that shown in FIGS. 11 and 12 is shown in FIGS. 22 and 23 respectively. A slot coater 650 is used to coat a liquid crystal material 117 optionally further comprising a solvent onto the surface of the surface relief birefringent element 120. After a drying stage to remove the solvent, a top electrode 150 and a support substrate 155 are brought in close proximity to the liquid crystal material 117 so that a variable electric field is produced across each lens segment 112 as described previously. The liquid crystal material 117 is then cured using the UV lamp.

Figure 24:
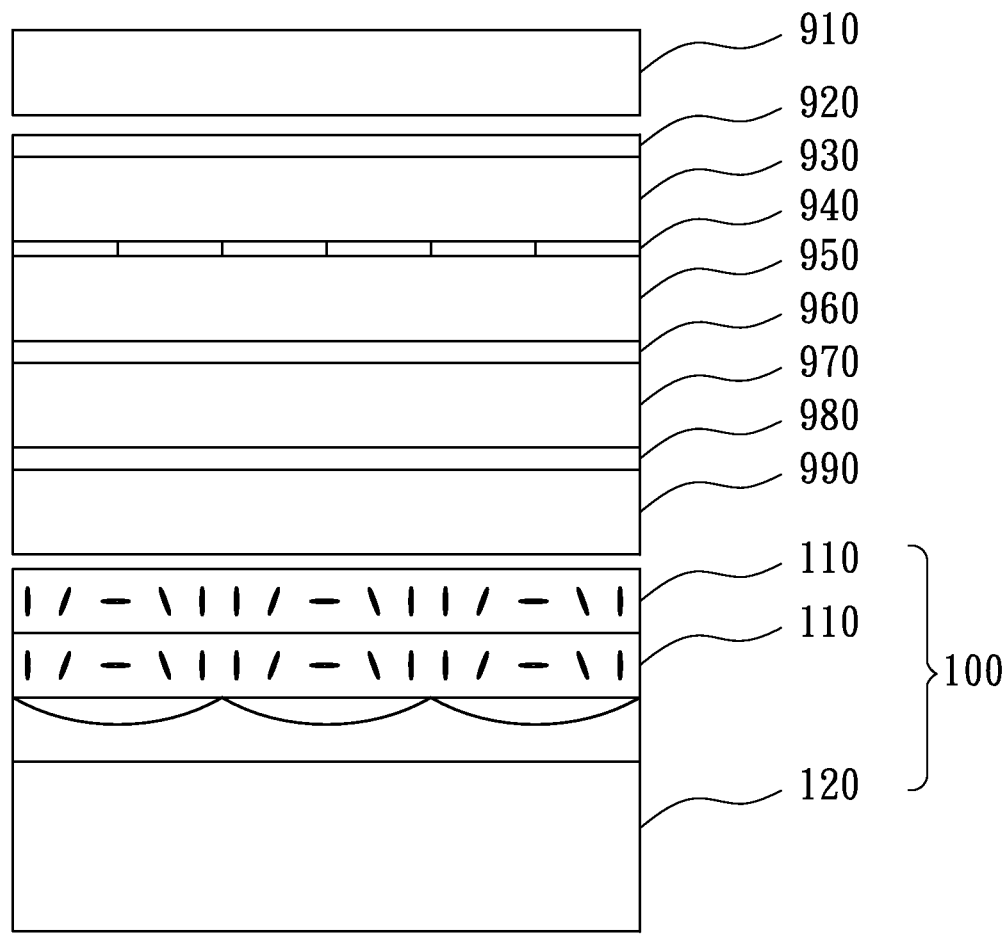
FIG. 24 shows the use of the graded index birefringent component of FIG. 19 in a switchable autostereoscopic display.

FIG. 24 shows the use of the graded index birefringent component 100 of FIG. 19 in a switchable autostereoscopic display. A backlight 910 illuminates a polarizer 920 attached to the rear surface of an LCD substrate 930. A pixel plane 940 modulates the light phase from the polarizer 920 and passes light through a substrate 950 to an output polarizer 960. The light passes through the substrate 970, a switchable polarization rotation layer 980, a substrate 990 and the graded index birefringent component 100, sequentially. In the 2D mode, the output polarization from the switchable polarization rotation layer 980 and output polarizer 960 is incident on the ordinary index of the liquid crystal in the graded index birefringent component 100 and so sees no optical path difference in the graded index birefringent component 100 and no index step at the surface relief birefringent element 120. In the 3D mode, the switchable polarization rotation layer 980 is adjusted so that the polarization state falling on the graded index birefringent component 100 sees a varying liquid crystal orientation across the width of each lens segment of the liquid crystal layer 110, thus creating an optical path difference across each lens segment, and a focusing function. In the surface relief birefringent element 120, the light sees an index step at the surface relief birefringent element 120, and so the lens also has a lens function. In this manner, the optical power of the graded index birefringent component 100 is greater than for the individual structures. Advantageously, this enables the viewing distance of the switchable autostereoscopic display to be reduced, and the glass thickness to be reduced. Further, in multiview displays for a fixed resolution base panel, the angular viewing freedom can be increased. Such a structure has low additional cost compared to the alignment of multiple lens structures.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A graded index birefringent component, comprising:
   at least one liquid crystal layer having a plurality of lens segments, each of the lens segments having a plurality of liquid crystal molecules therein, wherein the orientation of the liquid crystal molecules varies across each lens segment of the liquid crystal layer;
   an isotropic layer having a plurality of sags therein; and
   a birefringent layer covering the isotropic layer, wherein the liquid crystal layer is stacked on the birefringent layer, and the lens segments of the liquid crystal layer are aligned with the sags of the isotropic layer.

2. The graded index birefringent component of claim 1, wherein the liquid crystal layer is made from a curable liquid crystal material.

3. The graded index birefringent component of claim 1, wherein the orientation of the liquid crystal molecules is permanently fixed.

4. The graded index birefringent component of claim 1, wherein the liquid crystal molecules in the edge of each lens segment of the liquid crystal layer have a homeotropic alignment.

5. The graded index birefringent component of claim 1, wherein the liquid crystal molecules in the center of each lens segment of the liquid crystal layer have a homogeneous alignment.

6. The graded index birefringent component of claim 1, wherein the orientation of the liquid crystal molecules gradually varies from the edge to the center of each lens segment of the liquid crystal layer.

7. The graded index birefringent component of claim 1, further comprising:
   a bottom electrode disposed between the isotropic layer and the birefringent layer.

8. The graded index birefringent component of claim 1, further comprising:
   a bottom electrode disposed underneath the isotropic layer.

9. The graded index birefringent component of claim 1, wherein a plurality of the liquid crystal layers are stacked.

10. A method for manufacturing a graded index birefringent component, the method comprising:
    forming a surface relief element having an isotropic layer having a plurality of sags therein and a birefringent layer covering the isotropic layer;
    forming a curable liquid crystal material on the birefringent layer of the surface relief element;
    applying an electric field across the curable liquid crystal material, wherein the curable liquid crystal material has a plurality of lens segments self aligned with the sags of the isotropic layer of the surface relief element, and the electric field varies across each lens segment of the curable liquid crystal material; and
    curing the curable liquid crystal material to form a liquid crystal layer.

11. The method of claim 10, wherein the electric field is maximized in the edge of each lens segment of the curable liquid crystal material.

12. The method of claim 10, wherein the electric field is minimized in the center of each lens segment of the curable liquid crystal material.

13. The method of claim 10, wherein the electric field gradually varies from the edge to the center of each lens segment of the curable liquid crystal material.

14. The method of claim 10, wherein the step of forming the curable liquid crystal material on the birefringent layer of the surface relief element comprises:
    forming a flexible sheet;
    applying the curable liquid crystal material to the birefringent layer of the surface relief element; and
    applying the flexible sheet over the surface relief element with the curable liquid crystal material sandwiched between the birefringent layer of the surface relief element and the flexible sheet.

15. The method of claim 14, further comprising:
    forming a top electrode on the flexible sheet; and
    forming a bottom electrode between the isotropic layer and the birefringent layer of the surface relief element;
    wherein the step of applying the electric field across the curable liquid crystal material comprises: electrically attaching a voltage source to the top electrode and the bottom electrode.

16. The method of claim 14, further comprising:
    forming a top electrode on the flexible sheet; and
    forming a bottom electrode underneath the isotropic layer of the surface relief element;
    wherein the step of applying the electric field across the curable liquid crystal material comprises: electrically attaching a voltage source to the top electrode and the bottom electrode.

17. The method of claim 10, further comprising:
    providing a top electrode on the curable liquid crystal material, wherein the top electrode comprises a plurality of electrode layers at least one of which is patterned and a dielectric layer separating the electrode layers; and
    forming a bottom electrode between the isotropic layer and the birefringent layer of the surface relief element;
    wherein the step of applying the electric field across the curable liquid crystal material comprises: electrically attaching a voltage source to the top electrode and the bottom electrode.

18. The method of claim 10, further comprising:
    providing a top electrode on the curable liquid crystal material, wherein the top electrode comprises a plurality of electrode layers at least one of which is patterned and a dielectric layer separating the electrode layers; and
    forming a bottom electrode underneath the isotropic layer of the surface relief element;
    wherein the step of applying the electric field across the curable liquid crystal material comprises: electrically attaching a voltage source to the top electrode and the bottom electrode.

19. The method of claim 10, further comprising:
    delaminating the liquid crystal layer from the birefringent layer of the surface relief element.

* * * * *